UNITED STATES PATENT OFFICE.

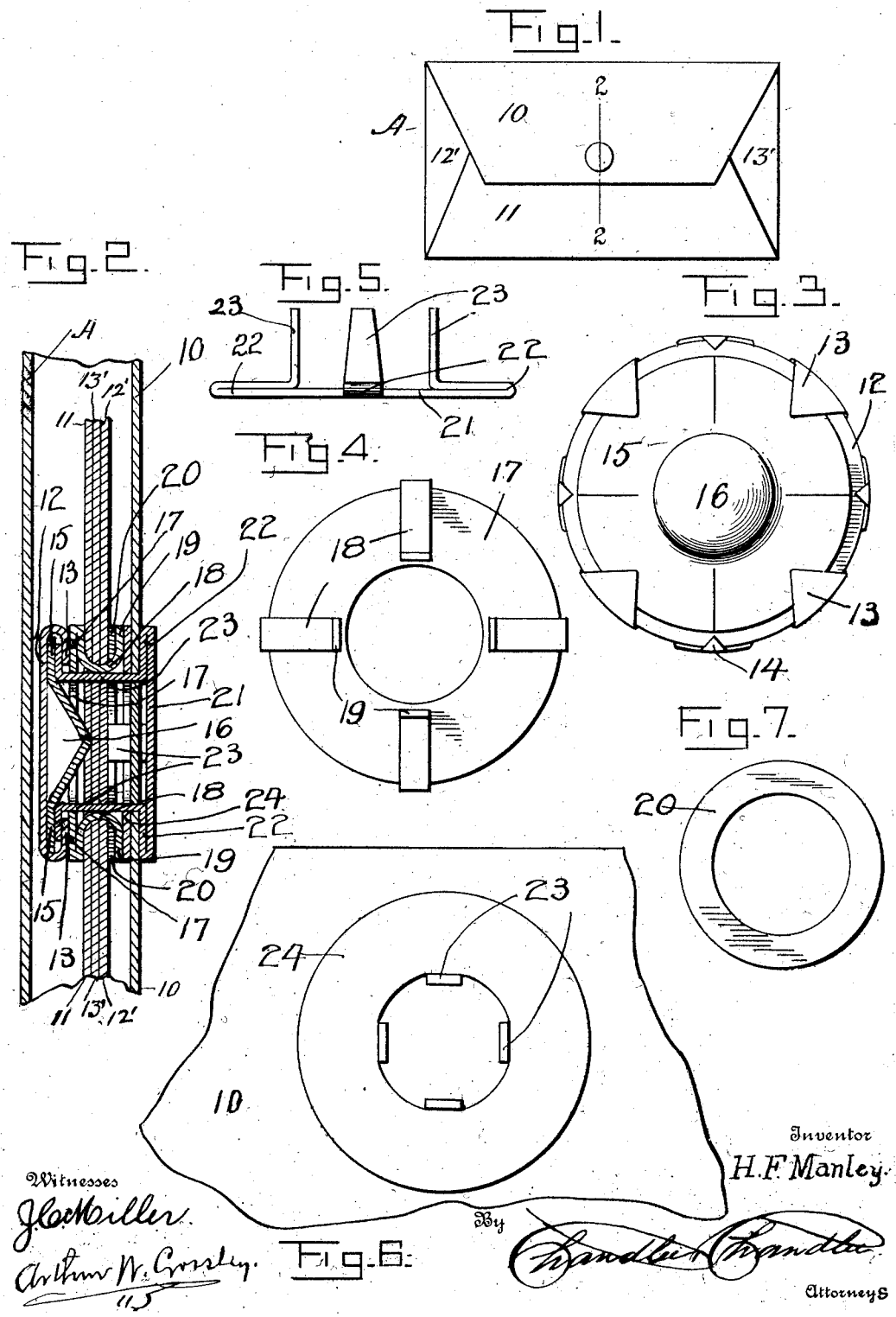

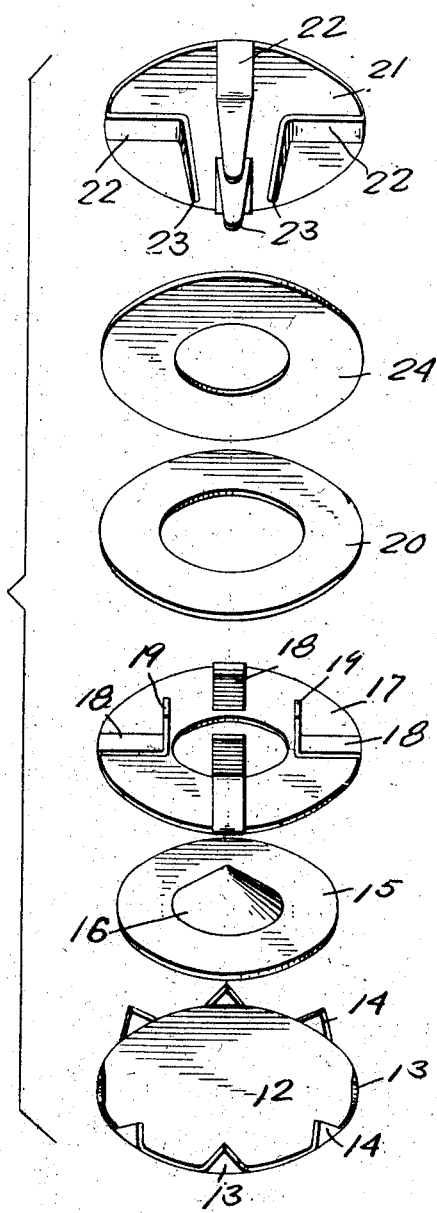

HOMER F. MANLEY, OF VICTOR, NEW YORK.

ENVELOP-FASTENER.

No. 883,035. Specification of Letters Patent. Patented March 24, 1908.

Application filed December 18, 1906. Serial No. 348,420.

*To all whom it may concern:*

Be it known that I, HOMER F. MANLEY, a citizen of the United States, residing at Victor, in the county of Ontario, State of New York, have invented certain new and useful Improvements in Envelop-Seals; and I do hereby declare the following to be a full, clear, and exact description of the invention, such as will enable others skilled in the art to which it appertains to make and use the same.

This invention relates to envelop and commercial package-wrapper seals, and has for its object to provide a seal which, although simply constructed, will preclude any possibility of opening the envelop or package-wrapper without destroying the same.

Broadly stated, the invention consists of an annular disk having tongues or prongs stamped up therefrom, the disk being secured to the flaps of the envelop, and a second disk member, which is secured to the final sealing flap or body of the envelop and is provided with a rounded outstanding boss. When sealing the envelop, these two disk members are pressed together and the tongues formed upon the first named disk member are bent or riveted by contact with the boss in such a manner that they will secure the flaps in closed position upon the body or final sealing flap of the envelop.

The nature of the invention is fully and clearly ascertainable from the device portrayed in the annexed drawings, forming a part of this specification, in view of which it will first be described with respect to its construction and mode of use, and then be pointed out in the subjoined claims.

Of the said drawings—Figure 1 is a plan of an envelop in closed position, showing my seal applied thereto. Fig. 2 is a detail vertical sectional view through the envelop and seal, showing the manner of applying the seal thereto. Fig. 3 is a plan of the boss or riveting member of the seal and connections before being applied to the envelop. Fig. 4 is a similar view of the fastening ring for securing the boss or riveting member to the envelop. Fig. 5 is a side elevation of the tongued member of the seal. Fig. 6 is an inside view of the final-sealing or body flap of the envelop, showing the means for securing the outer prime tongued-member to the envelop. Fig. 7 is a plan view of the washer used in securing the bossed or riveting member to the envelop. Fig. 8 is a perspective view of the several parts of the fastener separated, but still in the relative true positions of the parts. Figs. 2 to 8, inclusive are drawn to a greatly enlarged scale.

Referring more specifically to the drawing, A denotes an envelop, and 10 the top or final-sealing flap, 11 is the bottom flap and 12′ and 13′ the side flaps or wings.

The seal embodied in my invention comprises as hereinbefore stated, a tongued member 12 and a boss or riveting member 15. The tongued member is composed of a disk which is provided at its periphery with a number of tongues 13 and 14, the tongues 13 alternating with the tongues 14. The riveting disk proper, 15, is held securely upon the disk 12 by means of the tongues 14 which are bent over upon the margin of the disk 15, (see Fig. 3) and this latter disk has a convex boss 16, stamped up therefrom, the said boss being located directly centrally of the disk.

The annular ring 17 provided with the tongues 18 is placed on the ends of the tongues 14 bent over on the face of the disk 15 and is secured in position by bending the tongues 13 of said disk 12 over upon the said annular ring 17. The tongues 18 of the annular ring 17 are first bent downward upon the ring 17 itself, and then upward at their inner ends, adjacent the opening in the ring, and at right angles to the downwardly bent portions, as indicated by the numeral 19. The right angularly bent portions 19 of these tongues are engaged through the meeting portions of the flaps 11, 12′ and 13′ forming the back of the envelop and are bent or clenched down upon a washer 20, this washer serving to strengthen the connection as will be readily understood.

As disclosed in the drawings, (see Fig. 2), the ring 17 rests upon the tongues 13 which are bent down on the said ring, and hence the ring is supported in spaced relation to the disk 12.

The detailed description thus far given comprises the inner sealing means connected with the bottom flaps and side flaps or wings. The other member of the seal connected with the top or final-sealing flap 10, comprises a disk 21 at the outer periphery of which are formed tongues 22 which, as in the case of the tongues 18, are bent down upon the disk and thence upwardly at right angles thereto, as at 23, and these tongues are passed through the flap 10 of the envelop and also through a washer 24 which is disposed upon the opposite side of the said flap, 10, to that of the disk 21.

In proceeding to seal the package or envelop, the disk 12, with the clenching-plate thereon, as shown in Fig. 3, and the ring 17 arranged on the clenching-plate and will be placed on the body and the bottom flap and side wings will be folded thereover. The washer-ring 20 will then be placed upon the material composing the said bottom flap and side wings in position to have the angular bent ends 19 of the tongues 18 pass through the hole in said washer and clench outward over the margin of the same. This is done when the final-closing flap, carrying the disk 21 and having the projecting prongs 23 extending through the hole in the washer ring 24, is folded over so that the said prongs are projected through the ring 20, the hole in the ring 17, and, striking the clenching plate, the prongs 23 will be turned out under the tongues or tabs 13. It is understood, of course, that pressure will be provided to the sides of the device to effect the sealing.

In further elucidation of the improvements effected and shown in the annexed drawings, it is stated that the washers 20 and 24 and ring 17 are employed for the purpose of giving a broad bearing to the clenching tongues or parts on the paper or other means that compose the flaps, otherwise the said clenching devices would be likely to tear through the paper. The disk 21 is directly engaged or connected with the disk 12 through the medium of the tongues 23 the ends of which are clenched under the tongues or tabs 13 projecting over the periphery of the riveting or clenching disk 15 and in spaced relationship thereto until the final sealing takes place, when the outside and inside disks will be pressed toward each other with force sufficient to effect the clenching or riveting of the parts. The washer 20 is bound to the outside of the folded bottom and side flaps by the tongues 18 19 of the ring or washer 17, practically on the innerside of said flaps; and the washer 24 bears directly against the tongues 19 on the outside of the washer 20.

By the means specified it will be seen that an envelop or wrapper sealed with my improved sealing device cannot be opened without tearing the paper or other means so that it cannot be resealed, if at all, without leaving evidence that the envelop or package had been surreptitiously tampered with.

What is claimed is—

A seal for envelop and cognate means consisting of an outside and an inside disk, a riveting disk secured to the inside disk, a ring provided with clenching tongues secured on the riveting disk and the outside and inside disks being provided with riveting means, the said disks and ring being adapted, as described, to clenchingly secure the parts together and connecting the material thereto between them, and washer rings on opposite sides of the material.

In testimony whereof, I affix my signature, in presence of two witnesses.

HOMER F. MANLEY.

Witnesses.
SEYMOUR BOWERS,
CHARLES H. STUBBS.